United States Patent [19]

Honda et al.

[11] 4,117,036

[45] Sep. 26, 1978

[54] FUNCTIONAL HIGH POLYMERIC SUBSTANCES HAVING α,β-UNSATURATED CARBOXYLATE GROUP AND THE COMPOSITION THEREFROM

[75] Inventors: Toshio Honda, Akigawa; Itsuo Tanuma, Tokorozawa; Shoji Tanaka, Higashi-Yamato; Koichi Iwami, Kunitachi; Yukio Fukuura, Kodaira; Yoshikatsu Suzuki, Higashi-Murayama, all of Japan

[73] Assignee: Bridgestone Tire Company Limited, Tokyo, Japan

[21] Appl. No.: 746,556

[22] Filed: Dec. 1, 1976

[30] Foreign Application Priority Data

Dec. 1, 1975 [JP] Japan .............................. 50-143767

[51] Int. Cl.² .......................... C08F 8/20; C08F 8/30; C08F 8/36; C08F 8/14

[52] U.S. Cl. ............................ 260/878 R; 260/37 R; 260/42.44; 260/42.47; 260/680 B; 260/879; 526/30; 526/46; 526/56; 526/89; 526/220; 528/364; 526/14; 526/38

[58] Field of Search ..................... 526/220, 89, 46, 30; 260/680 B, 79.3 R, 878 R, 879

[56] References Cited

U.S. PATENT DOCUMENTS

3,402,136  9/1968  Sakuragi et al. ...................... 526/46

Primary Examiner—William F. Hamrock
Attorney, Agent, or Firm—Sughrue, Rothwell, Mion, Zinn and Macpeak

[57] ABSTRACT

A novel functional high polymeric substance having α,β-unsaturated carboxylate group, which is obtained by reacting a liquid high polymeric substance containing carbon-to-carbon unsaturated double bond or a solution of said high polymeric substance with α,β-unsaturated carboxylic acid and its derivative in the presence of pseudo halogen compound. A rubber composition suitable for sealant is obtained by compounding said functional high polymeric substance with a plasticizer and/or a filler.

18 Claims, No Drawings

FUNCTIONAL HIGH POLYMERIC SUBSTANCES HAVING α,β-UNSATURATED CARBOXYLATE GROUP AND THE COMPOSITION THEREFROM

BACKGROUND OF THE INVENTION (1) Field of the Invention

The present invention relates to novel functional high polymeric substances having α,β-unsaturated carboxylate group and the composition therefrom.

(2) Description of the Prior Art

Recently many proposals in which a novel functional polymer having different characteristics from the raw polymer materials is obtained by modifying a high polymeric substance, have been made.

As the methods for developing novel high polymers by modifying well known high polymers, graft copolymerization, block copolymerization, polymer blending and the formation of derivatives by a chemical reaction have been hitherto effected.

Especially, when a well known polymer is used as a raw material, the latter method, that is a chemical reaction, has been applied in order to obtain a different functional polymer from the well known high polymer.

For example, there has been disclosed in U.S. Pat. No. 3,135,716 a process for preparing functional high polymer having terminal -OH group, -COOH group or halogen atom by reacting diene polymer obtained by using lithium catalyst with compounds having various functional groups, such as alcohol, organic acid or halogen.

Furthermore, the method for introducing -OH group or —COOH group into the unsaturated high polymeric substance by applying the reaction disclosed by C. F. Irwin (C. F. Irwin and G. F. Hennion, J. Aoner. Chem. Soc. 63 858 (1941)) has been well known. This reaction is carried out by reacting the unsaturated high polymeric substance with alcohol, phenol or organic carboxylic acid in the presence of an alkyl hypohalite.

However, the resulting polymers have inherent functional group respectively and show the reactivity to the compounds which are reactive to such functional group as —OH group or —COOH group, but the reactivity of the polymers is insufficient in some use purpose and for example, these polymers have not been satisfactorily applied for a sealant or an adhesive, because they are lacking in self-hardenable property and adhesive property.

A sealant, especially tire sealant for puncture-proof tire which is coated on the inner surface of tire, is required to have excellent adhesive and flow properties together with self-hardenable property, not to injure the inner wall of tire and not to subject itself to the oxidative degradation under the severe condition.

The present invention provides a novel functional high polymeric substance which can act as one component of an excellent sealant composition.

SUMMARY OF THE INVENTION

According to the present invention, there is provided a novel high polymeric substance having α,β-unsaturated carboxylate group which is obtained by reacting (A) a liquid high polymeric substance containing carbon-to-carbon unsaturated double bond or a solution of said high polymeric substance with (B) an α,β-unsaturated carboxylic acid or its derivatives represented by the following formula,

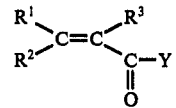

[wherein $R^1$, $R^2$ or $R^3$ is selected from the group consisting of hydrogen and hydrocarbon radicals having carbon number of from 1 to 10 and it may be same or different each other, Y is a radical selected from the group consisting of —OH group, —O—$(CH_2)_n$OH group, —O—$[(CH_2)_mO]_l$H group and —$NR^4R^5$ group (wherein $R^4$ or $R^5$ is selected from the group consisting of hydrogen, hydrocarbon radicals having carbon number of from 1 to 10 and alkoxy groups having carbon number of from 1 to 10) and $n$, $m$ or $l$ is an integer of from 1 to 30)] in the presence of C) pseudo-halogen compound.

According to another aspect of the present invention, there is provided a rubber composition which comprises compounding 100 parts of said high polymeric substance having α,β-unsaturated carboxylate group with from 200 to 1,500 parts of plasticizer and/or from 1 to 500 parts of filler.

As one example of the reaction according to the present invention, the following scheme may be proposed when polybutadiene, methacrylic acid and N,N-dichloroethyl urethane are applied as (A), (B) and (C) components, respectively.

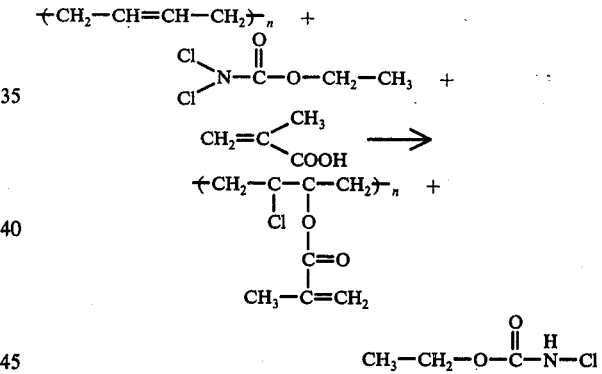

The reaction proceeds selectively and the objective functional polymer is obtained with high efficiency. It is an object of the present invention to provide a novel functional polymer having self-hardenable property under the restricted condition and adhesive property due to α,β-unsaturated carboxylate group branched on polymer chain.

The resulting polymer is hardenable under the anaerobic condition and the cross-linking is accelerated under the irradiation of ultra-violet ray, electron beam, by heating or by adding a radical initiator.

It is anther object of the present invention to provide a main ingredient of a sealant composition which is required to have hardenable and adhesive properties together with proper flow behavior.

It is further object of the present invention to provide a rubber composition suitable to sealant especially, tire sealant which is coated on the inner wall of tire.

The composition obtained has good adhesive property and proper hardness which does not flow under the rotation of tire at a high speed. The rubber composition according to the present invention is effective not only in use as a tire sealant but also to the sealing agent for architectures, construction workings, vehicles and ships.

DESCRIPTION OF THE PREFERRED EMBODIMENTS

The high polymeric substances containing carbon-to-carbon unsaturated double bond (A) to be used in the present invention include a variety of high polymeric substances containing cargon-to-carbon unsaturated double bond in molecule, such as natural rubber, polyisoprene, polybutadiene, polychloroprene, butadiene-styrene copolymer, butadiene-acrylonitrile copolymer, butadiene-vinyl pyridine-styrene copolymer, isobutylene-isoprene copolymer, butadiene-acrylic acid copolymer, butadiene-methacrylic acid copolymer, butadiene-methyl acrylate copolymer, butadiene-methyl methacrylate copolymer, and ethylene-propylene-diene terpolymers, such as ethylene-propylene-dicyclopentadiene terpolymer, ethylene-propylene-5-ethylidene-2-norbornene terpolymer and ethylene-propylene-1,4-hexadiene terpolymer, and also polybutene and its derivatives having terminal double bond may be used. Among them, the use of ethylene-propylene-diene terpolymers and isobutylene-isoprene copolymer can provide the preferable tire sealant composition. The molecular weight of the high polymeric substances (A) described above is not limited and may be chosen according to the use purpose. However, it is preferable to use ones having molecular weight of more than 500.

Said high polymeric substances (A) are usually used in a solution form dissolved in a suitable solvent, however, when said high polymeric substances themselves are liquid or viscous, it is matter of course that these polymeric substances can be directly subjected to the reaction.

As the solvents to be used in the present invention, ones which have a high solubility for said high polymeric substances (A) and can stably dissolve the components (B) and (C) described hereinafter are selected and these solvents may be used alone or in a mixture thereof.

As such solvents, mention may be made of aliphatic hydrocarbons, such as pentane, hexane, heptane, octane; alicyclic hydrocarbons, such as cyclohexane; aromatic hydrocarbons, such as benzene, nitrobenzene, toluene, xylene; linear or cyclic ethers, such as dioxane, diethylether, tetrahydrofurane; esters, such as ethyl acetate, methyl acetate; ketones, such as methyl ethyl ketone, acetone, cyclohexanone, methyl isobutyl ketone; halogenated hydrocarbons, such as dichloromethane, chloroform, carbon tetrachloride, halogenated benzene; preferably hexane, toluene, benzene, tetrahydrofuran, acetone, dichloromethane, heptane, ethyl acetate and methyl ethyl ketone.

The α,β-unsaturated carboxylic acid or its derivatives (B) to be used in the present invention is at least one compound represented by the following formula

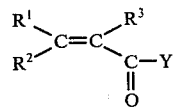

[wherein $R^1$, $R^2$ or $R^3$ is selected from the group consisting of hydrogen and hydrocarbon radicals having carbon number of from 1 to 10 and it may be same or different each other, Y is a radical selected from the group consisting of —OH group, —O—$(CH_2)_n$OH group, —O—$[(CH_2)_mO]_l$H group and —$NR^4R^5$ group (wherein $R^4$ or $R^5$ is selected from the group consisting of hydrogen, hydrocarbon radicals having carbon number of from 1 to 10 and alkoxy groups having carbon number of from 1 to 10) and n, m or l is an integer of from 1 to ;b 30]. As such components (B), mention may be made of acrylic acid, methacrylic acid, crotonic acid, sorbic acid, cinnamic acid, 2-hydroxyethyl acrylate, 2-hydroxyethyl methacrylate, N-methylol acrylamide, N-methylol methacrylamide, polyethyleneglycol monoacrylate, polyethyleneglycol monomethacrylate and polytetramethyleneglycol monomethacrylate; preferably acrylic acid, methacrylic acid, 2-hydroxyethyl acrylate and 2-hydroxyethyl methacrylate.

An amount of the component (B) to be used in the present invention is in the range of from 0.5 to 2.5, preferably from 1.0 to 2.0 moles, to 1.0 mole unsaturated double bond of the high polymric substance (A).

The pseudo-halogen compounds (C) to be used in the present invention include alkyl hypohalites, N-haloamides represented by the following formula

(wherein X is a halogen atom, A is a carboxyl radical, a sulfonic acid radical or a carbonate monoester radical and B is hydrogen atom, a halogen atom or carboxyl radical), halogenated isocyanates and other halogen-containing compounds.

As alkyl hypohalites, mention may be made of primary alkyl hypohalites, secondary alkyl hypohalites, tertiary alkyl hypohalites. Among them, tert.-alkyl hypohalites, such as tert.-butyl hypochlorite, tert.-amyl hypohclorite are preferred in view of the stability of the compound.

As N-haloamides, mention may be made of N-haloamides containing carbonate monoester radical, such as N-chlorobutyl urethane, N-bromobutyl urethane, N,N-dichloroethyl urethane, N,N-dichloromethyl urethane, N,N-dichloropropyl urethane, N,N-dichlorobutyl urethane, N,N-dichloropentyl urethane, N,N-dichlorohexyl urethane, N,N-dibromomethyl urethane, N,N-dibromoethyl urethane, N,N-dibromopropyl urethane, N,N-dibromobutyl urethane, N,N-dibromopentyl urethane, N,N-dibromohexyl urethane, N,N-dichloroallyl urethane, N,N-dichloroisopropyl urethane, N,N-dichloro-sec-butyl urethane, N,N-dichlorobenzyl urethane, N,N-dichlorophenyl urethane, N,N-dichloro-methallyl urethane, N,N,N',N'-tetrachloroethyleneglycol biscarbamate, N,N,N',N'-tetrabromoethyleneglycol biscarbamate; N-haloamides containing sulfonic acid radicals, such as N,N-dichlorobenzene sulfonamide, N,N-dibromobenzene sulfonamide, N,N-dichloromethyl sulfonamide, N,N-dibromomethyl sulfonamide, N,N-dichloroethyl sulfonamide, N,N-dibromoethyl sulfonamide, N,N-dichloropropyl sulfonamide, N,N-dibromopropyl sulfonamide, N,N-dichlorobutyl sulfonamide, N,N-dibromobutyl sulfonamide, N,N-dichloropentyl sulfonamide, N,N-dibromopentyl sulfonamide, N,N-dichlorohexyl sulfonamide, N,N-dibromohexyl sulfonamide, N,N-dichloro-p-toluene sulfonamide, N,N-dibromo-p-toluene sulfonamide, N,N-dichloro-o-toluene sulfonamide, N,N-dibromo-o-toluene sulfonamide, N,N-dichloro-p-chlorobenzene sulfonamide, N,N-dibromo-p-chlorobenzene sulfonamide, N,N-dichloro-p-bromobenzene sulfonamide, N,N-dibromo-p-bromobenzene sulfonamide, N,N-dichloro-p-iodobenzene sulfonamide, N,N-dibromo-p-iodobenzene sulfonamide, N,N,N',N'-tetrachloro-1,3-benzene disulfonamide, N,N,N',N'-tetrabromo-1,3-benzene disulfonamide, N,N,N',N'-tetrachloro-1,5-naphthalene disulfonamide, N,N,N',N'-tetrabromo-1,5-naphthalene disulfonamide, N,N,N',N'-tetrachloro-oxybis(benzene sulfonamide), N,N,N',N'-tetrabromo-oxybis(benzene sulfonamide), N,N,N',N'-tetrachloro-4,4-biphenyl disulfonamide, N,N,N',N'-tetrabromo-4,4-biphenyl disulfonamide, N,N,N',N',N'',N''-hexachloro-1,3,5-trisulfonamide; N-haloamides containing carboxylic acid radical, such as N,N-dichloroacetamide, N,N-dibromoacetamide, N-chlorosuccinic acid imide, N-bromo succinic acid imide.

As halogenated isocyanates, iodine isocyanate is preferably used.

As the other pseudo-halogen compounds (C), mention may be made of thiocyanogen, halogenated sulfur, sulfenyl halide, halomethyl ether, iodoazide, bromoazide, chloroiodine, bromoiodine, trichloroacetic acid bromide, trichloroacetic acid iodide, iodine nitrate, alkyl thionyl chloride, allylthionyl chloride, nitrosil chloride and nitrosil bromide.

Among them, alkyl hypohalites, halogenated isocyanates, N,N-dihaloalkyl urethanes, N,N-dichloroaryl sulfonamides and N-halocarboxylic acid imide are preferred. The amount of component (C) to be used in the present invention based on the component (B) is ordinarily in the range of 0.5–2.0:1, preferably about 1:1 in the mole ratio.

The reaction of the component (A) with the components (B) and (C) is carried out at a temperature of from −40° to 80° C, preferably from −10° to 40° C.

The mixing order of each of the components at the reaction, any order may be taken, for example, the components (B) and (C) are added simultaneously to the component (A), the component (C) is added to the component (A), thereafter the component (B) is added thereto or the components (B) and (C) are previously mixed and the resulting mixture is added to the component (A).

The mixing process may be properly chosen according to the kinds of characteristics of the components to be used.

According to the present invention, it is possible to obtain the functional high polymeric substances having various forms of liquid state, rubbery state and resinous state and various properties by varying the kind and molecular weight of th unsaturated high polymeric substances of the starting material, the reaction condition and the kind and the substitution degree of the polymerizable unsaturated monomers to be substituted. Furthermore, the resulting high polymeric substances are highly reactive due to the radical reaction of $\alpha,\beta$-unsaturated carboxylate residue. For example, the $\alpha,\beta$-unsaturated carboxylate residue causes the cross-linking reaction in the absence of oxygen and the hardening occurs. In addition the resulting high polymeric substances cause hardening by addition of a radical initiator, heating or irradiation of ultra-violet ray. So that, the resulting polymer, itself or by mixing with vinyl monomer, is useful for the material of industrial use, such as adhesive, paints, compounding agents, fillers, photo-sensitive materials and so on.

The present invention relates also to a rubber composition by compounding said high polymeric substances with a plasticizer and/or a filler. As the plasticizer to be used in the present invention, any plasticizers having affinity to said high polymeric substances containing $\alpha,\beta$-unsaturated carboxylate group may be used. For example, liquid rubber, vegetable oil, mineral oil, dioctyl adipate, tricresyl phosphite, low molecular weight polyolefins, polyalkylene glycols, liquid polyesters and liquid polyamide may be used. As the preferable plasticizer for a tire sealant, it is preferable to use polymers of $C_4$ to $C_5$ fraction of petroleum, such as liquid polybutene, liquid polyisobutylene-isoprene copolymer, liquid polyisobutylene-butadiene copolymer, liquid polypentene or liquid polysiopentene. Commercially available polybutene having the viscosity of from 20 to 33,000 centi stokes (cts) is most preferable in the present invention.

The amount of said plasticizer to be used in the present invention can be arbitrarily varied according to the purpose of the composition, however, in order to obtain the tire sealant composition, the amount of said plasticizer is used in the range of from 50 to 3,000 parts, preferably from 200 to 1,500 parts, more particularly from 300 to 800 parts to 100 parts of said high polymeric substance having $\alpha,\beta$-unsaturated carboxylate group (weight parts as solid content).

The composition according to the present invention, may be compounded with an inorganic or organic filler or a reinforcing material within the range which does not injure the use purpose together with said plasticizer. As said fillers, mention may be made of carbon black, calcium carbonate, magnesium carbonate, titanium oxide, clay, white carbon, calcium silicate, magnesium silicate, wood powder, stone powder, plastic powder, rubber powder, fibrous material, mineral powder, elastomeric polymer, ultra violet ray absorbent, antioxidant, pigment, dye, preferably carbon black, calcium carbonate, magnesium carbonate, titanium oxide, white carbon, calcium silicate and antioxidant.

The amount of a filler to be used in the present invention is in the range of from 1 to 500 parts, preferably from 5 to 100 parts, to 100 parts of said high polymeric substance having $\alpha,\beta$-unsaturated carboxylate group.

The composition for sealant according to the present invention is stable in solution state which is obtained by adding a proper solvent and the solution of the composition may be stored for a long time without gelation.

When it is used as a sealant of puncture-proof tire, the viscosity of the solution of the composition is ordinarily in the range of from 1,500 to 5,000 centi poise (cps) and it is coated and laminated on the inner wall of a tire by spraying or the other methods and the hardening begins as soon as the volatilization of the solvent is completed.

The hardening reaction is a radical reaction, so that it can be controlled with use of catalyst, light, heating, polymerization inhibitor or oxygen.

The hardening reaction may be accelerated by adding various polymerizable monomers, such as styrene, divinylbenzene, unsaturated carboxylic acids or their esters.

The sealant composition according to the present invention has ordinarily a high viscosity of from 0.1 to 5 million centi poise (cps) after hardening and network bonds have been formed owing to the reaction of mutual $\alpha,\beta$-unsaturated carboxylic groups, so that the flow at a high temperature is perfectly prevented and the composition is most preferable as a desirable tire sealant.

For example, in the conventional tire provided with the sealant layer, the sealant layer shows the flow phenomenon at the speed of about 140 Km/hr or more, while, in tire provided with the sealant layer composed of the sealant composition according to the present invention, the sealant layer of course, does not show any phenomenon of flow at the speed of 140 Km/hr, and said phenomenon does not occur at a higher speed, for example 180 Km/hr.

The following examples are given for the purpose of illustration of this invention and are not intended as limitations thereof.

EXAMPLE 1

Fifth grams of cis-1,4-polybutadiene (trademark: BR-01, made by Japan Synthetic Rubber Co.) was dissolved in 500 g of toluene and 8 g of methacrylic acid (0.1 mole equivalent to unsaturated double bond of said polybutadiene) was added thereto. To the resulting mixture, tert-butyl hypochlorite toluene solution (10 g of t-BuOCl dissolved in 10 g of toluene; the equimolar to methacrylic acid) was added dropwise by means of a dropping funnel while vigorously stirring. A few minutes after completion of the addition, yellow colour originated by t-BuOCl disappeared and thereafter the stirring was continued for 30 minutes. Then, the reaction mixture was poured into a large quantity of methanol and the resulting precipitated polymer was taken out. The polymer was dried and dissolved in purified toluene to prepare a specimen for infrared analysis. The infrared spectrum of the resulting polymer showed the absorptions at 1,710 cm$^{-1}$ and 1,160 cm$^{-1}$ assigned to carbonyl group and ester group

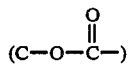

respectively.

On the other hand, the toluene solution of the resulting polymer was divided into four Erlenmeyer's flasks with stop cock. Then, 2% by weight based on the polymer of 50% methyl ethyl ketone peroxide (MEKPO) solution dissolved in dimethylphthalate was added to two flasks among the four flasks. Each one flask of the above two groups was purged with nitrogen gas and sealed with a cock.

The tendencies of the gelation of the four samples were observed. The results obtained were shown in Table 1.

Table 1

| Example No. | Catalyst | Atmosphere | Results |
| --- | --- | --- | --- |
| 1 - 1 | none | air | Gelation was not observed after 1 month. |
| 1 - 2 | none | nitrogen | Gelation after 1 week. |
| 1 - 3 | MEKPO | air | Gelation was not observed after 1 month. |
| 1 - 4 | MEKPO | nitrogen | Gelation after 1 day. |

The results showed that the resulting polymer had an anaerobic hardenability.

EXAMPLE 2

The same reaction as shown in Example 1 was conducted except that 50 g of liquid polybutadiene (trademark: R-45HT, made by Indemitsu Petrochemical Co.) dissolved in 50 g of toluene was used.

One drop of the purified and dried polymer was put on a glass plate and then another glass plate was put on the polymer drop and said polymer was pressed and fixed by the two glass plates. After one day, the glass plates were adhered strongly and it was impossible to separate the two glass plates.

EXAMPLE 3

Three solutions, each solution dissolving 50 g of liquid polybutadiene (R-45T) in 50 g of toluene were prepared and 8 g of methacrylic acid was added to each solution.

A solution of 14.4 g of N,N-dichloroethyl urethane (equimolar to said methacrylic acid) dissolved in 10 g of toluene, a solution of 22.2 g of N,N-dichlorotoluene sulfonamide (equimolar to said methacrylic acid) dissolved in 20 g of toluene and a solution of 16.4 g of N-bromosuccinic acid imide (equimolar to said methacrylic acid) dissolved in 20 g of toluene were added dropwise to the above described three solutions respectively.

After the reactions were completed, the resulting polymers were purified and taken out. Each of the resulting polymers was examined with respect to the anaerobic hardenability using the glass plates in the same manner as described in Example 2. All the three polymers hardened after one day.

EXAMPLE 4

A toluene solution of the polymer obtained in Example 1 was coated on a glass plate to form a film.

The film was subjected to three treatments of
 (a) exposure under sunlight
 (b) irradiation of ultraviolet ray and
 (c) leaving to stand in dark box, respectively and the solubility in toluene of said three films was determined. The film treated according to (c) dissolved in toluene, but the other two films only swelled.

From the above results, it was concluded that the polymer according to the present invention had hardenability under sunlight or ultraviolet ray.

EXAMPLE 5

Two solutions, each solution dissolving 65 g of styrene-butadiene copolymer (styrene content of 23.5%, trademark: SBR-1500, made by Japan Synthetic Rubber Co.) in 500 g of toluene were prepared and to these two solutions 6.7 g of acrylic acid (0.1 mole equivalent to unsaturated double bond of SBR) and 12.1 g of 2-hydroxyethyl methyacrylate (0.1 mole equivalent to unsaturated double bond of SBR) were added respectively.

To both the solutions, a solution of 10 g of tert-butyl hypochlorite (about equimole to acrylic acid) dissolved in 10 g of toluene was added respectively by means of a dropping funnel while vigorously stirring. After completion of the addition, the reaction product was purified in the same manner as described in Example 1 and dissolved in toluene. From these solutions films were prepared in the same manner as described in Example 4. These films were determined respectively with respect to the solubility in toluene in the same manner as described in Example 4.

From the results, the same conclusion as in Example 4 was obtained.

EXAMPLE 6

Three hundred grams of ethylene-propylene-diene terpolymer (EPDM) (trademark; EP-84X, made by Japan Synthetic Rubber Co.) was dissolved in 1,600 g of n-hexane. A mixture of 24.4 g of methacrylic acid (0.28 mole), 6.8 g of N,N-dichloro-p-toluene sulfonamide (0.28 mole) dissolved in 100 g of methylene chloride was added thereto and the resulting mixture was reacted at room temperature while stirring.

After the reaction was conducted for 3 hours, the reaction mixture was poured into a large quantity of methanol to precipitate and purify the resulting polymer. The polymer was dissolved again in n-hexane to obtain 15% by weight of polymer solution.

The infrared spectrum of the resulting polymer showed that the absorption at 3,050 cm$^{-1}$ assigned to the unsaturated double bond of dicyclopentadiene which was the third component of EPDM, almost disappeared and the absorptions at 1,730 cm$^{-1}$ and 1,160 cm$^{-1}$ assigned to carbonyl group of methacrylic acid appeared strongly.

Next, to 1,000 g of the resulting polymer solution of this example (EPDM containing methacrylic acid residue), 750 g of polybutene (trademark: 300R, made by Idemitsu Petrochemical Co.) as plasticizer, 75 g of white carbon (trademark: Nipsil VN-3, made by Nippon Silica Co.) and 5 g of titanium oxide (made by Ishihara Sangyo Kaisha Ltd.) were added and stirred thoroughly.

The viscosity of the resulting solution was 4,210 centipoise (cps) at 30° C (The measurement was made by means of the Viscometer made by Brookfield Co. Rotor No. 3, at 100 cycle/minute).

The resulting solution was storaged for one month and thereafter the viscosity was 4,250 cps, so it was confirmed that the crosslinking reaction did not cause even if the polymer was storaged for a long time.

700 g of the above described mixed solution was sprayed on the inner surface of two tubeless tires (trademark: RD108V (165-SR-13), made by Bridgestone Tire Co., Ltd.) in the coated width of 12 cm.

The coated layer did not flow under the static condition.

With respect to the tire provided with the sealant layer produced as described above, the puncture-sealing property test was carried out under the static condition and under the dynamic condition after said tires were left to stand for 1 week at room temperature after evaporation of the solvent. The static puncture-sealing property test was carried out as follows. Three kinds of iron nails having different lengths, such as 30 mm, 60 mm and 90 mm were used. Two nails of each length were hammered into the pattern block portion and its groove portion of the crown and shoulder parts of the tread respectively (the sum of nails: 24) so that the nails penetrate through the tire.

The tire was then left to stand for 24 hours and the air leakage was examined by means of aqueous solution of soap, however, no air leakage was detected.

Next, after all the nails were drawn out, the air leakage was examined, but no air leakage was detected.

The dynamic puncture-sealing property test was carried out as follows.

The running test on the tire specimen described above was carried out on an iron drum at the static pressure of 1.7 Kg/cm$^2$ and the load of 385 Kg in the test room (the room temperature was 38° C).

The tire was firstly run at a speed of 80 Km/hr for 1 hour and then 120 Km/hr, and 180 Km/hr for 1 hour at each speed on an iron drum. Then the tire specimen was removed from the wheel and the sealant layer laminated on the inner surface of the tire specimen was examined but the flow of the layer due to the centrifugal force was not observed.

EXAMPLE 7

To 300 g of butyl rubber (trademark: Esso butyl 218, made by Esso Standard Co.) dissolved in 1,600 g of n-hexane, 18.9 of methacrylic acid (0.22 mole) and 41.8 g of N,N-dichloro-p-toluene sulfonamide (0.22 mole) dissolved in 100 g of methylene chloride were added and the resulting mixture was reacted at room temperature (25° C) while stirring.

After 3 hours, the reactant was poured into a large quantity of methanol to precipitate and purify the resulting polymer. The resulting polymer was dissolved in n-hexane to get 15% polymer solution.

The infrared spectrum of the resulting polymer showed that the absorptions at 1,730 cm$^{-1}$ and 1,160 cm$^{-1}$ assigned to carbonyl group of methacrylic acid were strongly observed.

To 1,000 g of the polymer solution described above, 600 g of polybutene (300R) as the plasticizer, 75 g of white carbon (Nipsil VN-3) and 5 g of titanium oxide as the filler were added and stirred thoroughly. Then, 700 g of the resulting composition was sprayed to laminate the layer at the coated width of 12 cm on the inner surface of two tubeless tires (RD108V, 165-Sr-13 made by Bridgestone Tire Co. Ltd.) to obtain two puncture-proof tires.

The tire specimens were left to stand for 1 week after evaporation of solvent was completed and the puncture-sealing property was examined according to Example 6.

The results were that the air leakage was not observed in both cases where the nails were hammered into and where the nails were hammered into, thereafter the nails were drawn out. And also in the case of the running test at the high speed on the iron drum, the flow of the sealant layer was not found.

EXAMPLE 8

To 300 g of ethylene-propylene-diene terpolymer (EPDM: EP-84X, unsaturated double bond, 0.14 mole) dissolved in 1,700 g of n-hexane, 10.1 g of acrylic acid (0.14 mole) and 15.2 g of tert.butyl hypochlorite (1.14 mole) were added and the resulting mixture was reacted at 25° C while stirring.

After 3 hours, the reactant was poured into a large quantity of methanol to precipitate and purify the resulting polymer. The resulting polymer was again dissolved in n-hexane to get 15% polymer solution. From the infrared spectrum, it was confirmed that acrylic acid residue was introduced into EPDM.

To 1,000 g of the polymer solution described above, 750 g of polybutene (300R) as the plasticizer, 50 g of carbon black (HAF) and 20 g of white carbon (Nipsil VN-3) as the filler were added and stirred thoroughly.

The puncture-proof tire was prepared by using the composition described above according to the same method as described in Example 6 and puncture-sealing property was examined.

The results were that the air leakage was not observed in both cases where nails were hammered into and where nails were hammered into, thereafter the nails were drawn out.

And also in the case of the running test at the high speed on the iron drum, the flow of the sealant layer was not found.

EXAMPLE 9

To 300 g of butyl rubber (Esso butyl 218, unsaturated double bond; 0.11 mole) dissolved in 1,700 g of n-hexane, 18.9 g of acrylic acid (0.22 mole) and 23.8 g of tert-butyl) hypochlorite (0.22 mole) were added and the resulting mixture was reacted at room temperature while stirring. After 3 hours, the reactant was poured into a large quantity of methanol to precipitate and purify the resulting polymer. The polymer was again dissolved in n-hexane to get 15% of polymer solution.

From the infrated spectrum of the resulting polymer, it was confirmed that the residue of acrylic acid was introduced into butyl rubber. To 1,000 g of the polymer solution described above, 600 g of polybutene (300R) as the plasticizer, 50 g of carbon black (HAF) and 20 g of white carbon (Nipsil VN-3) as the filler were added and stirred thoroughly.

The puncture-proof tire was prepared by using the composition described above according to the same method as described in Example 6 and puncture-sealing property was examined.

The results were that the air leakage was not observed in both cases where nails were hammered into and where nails were hammered into, thereafter the nails were drawn out. And also in the case of the running test at the high speed on the iron drum, the flow of sealant layer was not found.

What is claimed is:

1. A high polymer substance having $\alpha,\beta$-unsaturated carboxylate group and anaerobic curability and curability under ultraviolet irradiation obtained by reacting (A) a liquid high polymeric substance containing carbon-to-carbon unsaturated double bond or a solution of a high polymeric substance containing carbon-to-carbon unsaturated bond with (B) an $\alpha,\beta$-unsaturated carboxylic acid or its derivatives selected from the group consisting of acrylic acid, methacrylic acid, 2-hydroxyethyl acrylate and 2-hydroxyethyl methacrylate in the presence of (C) at least one pseudo-halogen compound selected from the group consisting of alkylhypohalite, halogenated isocyanate, N, N-dihaloalkyl urethane, N,N-dichloroaryl sulfonamide and N-halocarboxylic acid imide, wherein the mole ratio of (A) to (B) is in the range of from 1:0.5 to 1:2.5.

2. A high polymeric substance having $\alpha,\beta$-unsaturated carboxylate group as claimed in claim 1, wherein said high polymeric substance (A) is at least one selected from the group consisting of polybutadiene, styrene-butadiene copolymer, ethylene-propylene-diene copolymer and isobutyleneisoprene copolymer.

3. A high polymer substance having $\alpha,\beta$-unsaturated carboxylate group as claimed in claim 1, wherein said pseudohalogen compound (C) is at least one selected from the group consisting of tert-butyl hypochlorite, iodine isocyanate, N,N-dichloroethyl urethane, N,N-dichloro-p-toluene sulfonamide and N-bromosuccinic acid imide.

4. A high polymer substance having $\alpha,\beta$-unsaturated carboxylate group as claimed in claim 1, wherein the mole ratio of component (A)/component (B) is in the range of from 1/1 to 1/2.

5. A high polymer substance having $\alpha,\beta$-unsaturated carboxylate group as claimed in claim 1, wherein the mole ratio of component (B)/component (C) is in the range of from 1/0.5 to 1/2.0.

6. A high polymer substance having $\alpha,\beta$-unsaturated carboxylate group as claimed in claim 1, wherein the reaction temperature is in the range of from $-40°$ to $80°$ C.

7. A rubber composition, which comprises compounding 100 parts of said high polymeric substance having $\alpha,\beta$-unsaturated carboxylate group as claimed in claim 1 with from 500 to 3,000 parts of a plasticizer.

8. A rubber composition as claimed in claim 7, wherein said plasticizer is selected from the group consisting of liquid polybutadiene, liquid isobutylene-isoprene copolymer, liquid polypentene, liquid polyisopentene and liquid isobutyl-butadiene copolymer.

9. A rubber composition as claimed in claim 7, the amount of the plasticizer is in the range of from 200 to 1,500 parts to 100 parts of the high polymer substance having $\alpha,\beta$-unsaturated carboxylate group.

10. A rubber composition which is obtained by compounding 100 parts of the high polymer substance having $\alpha,\beta$-unsaturated carboxylate group as claimed in claim 1 with from 1 to 500 parts of a filler.

11. A rubber composition as claimed in claim 10, wherein the filler is at least one selected from the group consisting of carbon black, calcium carbonate, magnesium carbonate, titanium oxide, clay, white carbon, calcium silicate, magnesium silicate, wood powder, stone powder, plastics powder, rubber powder, fibrous material, mineral powder, elastomeric polymer, ultraviolet ray absorbent, antioxidant, pigment and dye.

12. A rubber composition as claimed in claim 11, wherein the filler is at least one selected from the group consisting of carbon black, calcium carbonate, magnesium carbonate, titanium oxide, white carbon, calcium silicate and antioxidant.

13. A rubber composition as claimed in claim 10, wherein the amount of filler is in the range of from 5 to 100 parts to 100 parts of the high polymer substance having $\alpha,\beta$-unsaturated carboxylate group.

14. A rubber composition which is obtained by compounding 100 parts of the high polymer substance having $\alpha,\beta$-unsaturated carboxylate group as claimed in claim 1 with from 50 to 3,000 parts of the plasticizer and from 1 to 500 parts of the filler.

15. A high polymeric substance having $\alpha,\beta$-unsaturated carboxylate group as claimed in claim 1, wherein said $\alpha,\beta$-unsaturated carboxylate acid is methacrylic acid.

16. A rubber composition as claimed in claim 7, wherein said $\alpha,\beta$-unsaturated carboxylic acid is methacrylic acid.

17. A rubber composition as claimed in claim 10, wherein said $\alpha,\beta$-unsaturated carboxylic acid is methacrylic acid.

18. A rubber composition as claimed in claim 14, wherein said $\alpha,\beta$-unsaturated carboxylic acid is methacrylic acid.

* * * * *